March 26, 1940.    E. NASSIMBENE    2,194,833
ENDLESS V-TYPE BELT
Filed Aug. 14, 1939

INVENTOR.
ERNEST NASSIMBENE
BY Martin E. Anderson
ATTORNEY.

Patented Mar. 26, 1940

2,194,833

UNITED STATES PATENT OFFICE 2,194,833

ENDLESS V-TYPE BELT

Ernest Nassimbene, Denver, Colo., assignor to The Gates Rubber Company, Denver, Colo., a corporation of Colorado Application August 14, 1939, Serial No. 290,030

17 Claims. (Cl. 74—233)

This invention relates to improvements in flexible belts of the V-type and has reference more particularly to belts that have greater width than thickness.

In the operation of machines it is often desirable to provide a variable speed transmission for the purpose of accurately and conveniently altering the speed of a machine driven by a constant speed motor. Various types of speed changing mechanisms employing V-shaped belts and cooperating grooved pulleys are available. Such speed changing devices employ two cooperating pulleys so constructed and interconnected that by means of a screw or a lever the distance between the sides of one pulley can be reduced and the corresponding distance between the sides of the other pulley increased. The belt speeds that can be used with such drives is comparatively small which necessitates strong belts, and, since the thickness of a belt is limited, its width must be increased in order to get the necessary strength. Since such belts cannot bottom in the pulley grooves and are supported exclusively along their edges, the tension to which they are subjected has a tendency to produce an inward flexure that in turn reduces the tensions in the core in a progressive manner from the sides of the belt towards its center. The uneven distribution of the tension in the cords of the core subjects the cords near the edges to excessive strains and this reduces the life of the belt.

It is the principal object of this invention to produce a V-type belt with a cord core positioned adjacent or at its neutral axis and to so construct the belt that the belt as manufactured has unequal tension in the cords of the core and in which the tension increases from the sides to the center of the belt. This result is readily obtained by the simple expedient of building the belt transversely straight and then placing it in a curing mold which changes the shape from straight to outwardly convex. When an endless belt of straight transverse shape is put into a vulcanizing mold that changes its shape so as to make it transversely concave on its inner surface, the circumferential distance will be increased towards the middle. When the tension in the core cords is equal before such deformation it will increase towards the middle during such deformation and when cured the unequal tension will remain. When such a belt is applied to a machine the inward flexure will tend to equalize the tension. The arched construction will also resist inward flexure.

Another object of this invention is to produce a belt of the type disclosed and claimed in United States Letters Patent 2,163,347, granted June 20, 1939, to E. Nassimbene in which the transverse reenforcing members, in addition to being made of a rubber composition that is more rigid than the remainder of the belt, shall be arched so as to increase their resistance to bending.

The above and other objects that may appear as the description proceeds are attained by means of a construction and an arrangement of parts that will now be described in detail, and reference for this purpose will be had to the accompanying drawing in which the preferred construction has been illustrated, and in which.

Figure 1:
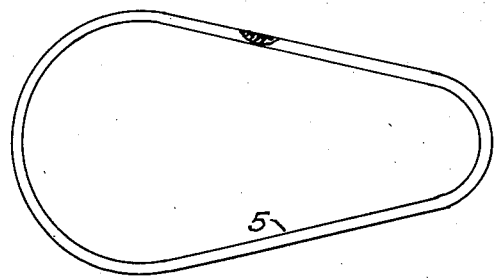
Figure 1 is a side elevation of the belt showing it as it appears when in place on two pulleys of different diameters, a portion has been broken away to show the construction.

In the drawing reference numeral 5 represents a belt of the V-type having greater width than thickness whose body portion is formed from rubber composition and whose outer surface is covered with rubberized fabric, preferably bias cut. The body of the belt consists of a layer 6 of comparatively soft elastic rubber, such as is usually employed in the construction of belts of this type. Supported on this rubber cushion or body is a layer of substantially inextensible cords 7 that occupy a position at the neutral axis of the belt and whose function it is to resist tensional strains.

Figure 3:
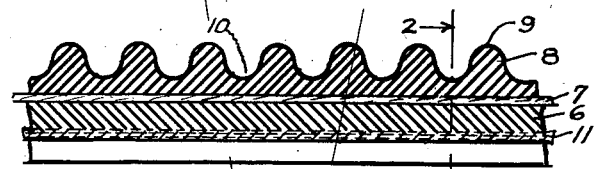
Figure 3 is a longitudinal section taken on line 3—3, Figure 2.

On the upper surface of the layer of cords is another layer of rubber which has been designated by reference numeral 8 and which is so compounded that when it is vulcanized it becomes quite rigid and offers a considerable resistance to flexure. The upper layer 8 is provided on its upper surface with a plurality of transversely extending ridges such as those designated by reference numeral 9 in Figure 3. The space between the ridges is quite deep so as to leave a comparatively thin layer of rubber at the bottom in the manner shown at 10 in this figure. A strip like that designated by reference numeral 8 will bend quite readily in the direction of its length, but will resist very strongly any forces tending to bend it transversely. The use of such a reenforcing strip has been shown and claimed in the United States patent above identified and its advantages will therefore not be explained in this specification to any greater extent than is found necessary to explain the features of construction to which this application is directed. The bottom and the sides of the belt are covered with one or more layers 11, of rubberized fabric which extends upwardly to the top of the ridges 9. The upper surface of the rubber layer 8 is covered with a layer of rubberized bias cut fabric so as to give the belt a protective covering which prevents it from being accidentally damaged during handling and transportation. The several parts of the belt have been clearly shown in the drawing and at this point the method of constructing the belt will be explained.

Figure 2:
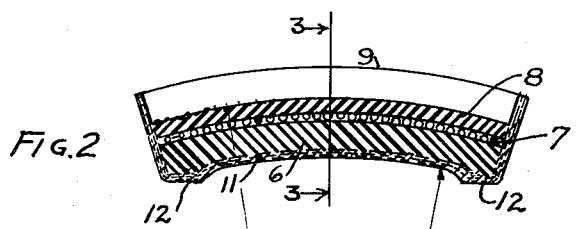
Figure 2 is a transverse section taken on line 2—2, Figure 3.

The belt is originally formed transversely flat in the same manner as is common with ordinary belts of this construction. After the belt has been built up into the desired shape, it is placed in a curing form having a shape corresponding to the outline shown in Figure 2. The curing form, as can be seen from the construction in Figure 2, is of such shape that it will arch the belting transversely, thereby increasing its length at the center compared to the length at the edges, and this, in turn, will submit the tension cords 7 to varying degrees of tension. Since the length of the belt is the greatest at the middle point and decreases gradually towards the edges, the tension in the cords will be modified so that it will increase gradually from the edges towards the center of the belt.

It will be seen from Figure 2 that the bottom of the belt is provided with flat areas 12, along each of its inner edges and the purpose of this is to provide driving surfaces that will contact with an ordinary flat surfaced pulley, as it frequently happens that in operating belts of the V-type small V-pulleys are used in combination with large flat surface pulleys and by providing flat areas 12, the belt will wear longer than if the sharp corners were to rest directly on the surface of the pulley.

Figure 4:
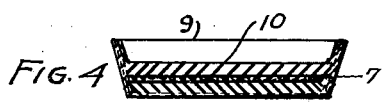
Figure 4 is a transverse section similar to that shown in Figure 2 and shows the form of the belt before it has been cured.

After the belt has been cured, it will retain the shape given it by the curing mould, which shape is shown in Figure 2. The transverse cross sectional shape of the belt, after it is built up and before it is cured, is shown in Figure 4 from which it will be seen that the cords of the core lie in a straight line transversely of the belt. When the belt is positioned in the curing mould, the center of the belt is stretched so as to give it a curved transverse cross section like that shown in Figure 2; this curving of the belt stretches the center cords more than the end cords whereby the tension in the cords increases towards the middle of the belt, being greatest at the longitudinal center and least near the sides of the belt. The curing of the rubber composition sets the material in the shape shown in Figure 2 and a belt so constructed will therefore have a cord core in which the tension of the cords increases progressively towards the middle of the belt. By arching the belt in the manner shown this modification in the tension can be readily obtained.

Figure 5:
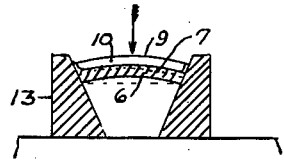
Figure 5 is a sectional view showing the position of the belt in a pulley.

The transversely arched shape of the belt has also another advantage over a flat belt and this can be more clearly explained when reference is had to Figure 5 in which reference numerals 13 designate two parts of an adjustable pulley having downwardly and inwardly inclined sides for engaging the sides of the belt. Due to the arcuate transverse shape of the belt the latter acts like an ordinary arch and resists inward flexure due to the fact that the sides of the belt abut against the immovable surfaces of the pulley parts 13.

In order to still further resist the tendency of belts of this type to flex inwardly during operation, the outer rubber composition layer 8 is made from a mixture of rubber and vulcanizing material that will make it comparatively hard and rigid and the transverse ridges 9 of which there are a large number, serve as reenforcing or strengthening members that in themselves offer great resistance to transverse flexure and this resistance is greatly increased due to the arcuate form as shown in the drawing.

By making the inner layer 6 of rubber composition that is quite soft and flexible compared to the composition in the layer 8, the transverse bulging of the belt when passing around a pulley tends to force the sides of the belt against the driving surfaces of the pulley with a force that increases as the curvature of the pulley decreases. By having the ribs 9 on the outer surface of the belt and having them separated by deep grooves 10, the belt will readily flex in the direction of its lower surface regardless of the fact that the material is comparatively rigid.

In the example illustrated the inner surface of the belt and the ends are provided with a plurality of layers of rubberized cord fabric and the sides are covered with bias cut fabric which permit changes in length and shape when the belt assumes the curvature forced upon it by the pulleys with which it is cooperating. The transversely corrugated surface of the belt is preferably covered with a layer of bias cut fabric as indicated at 14 in Figure 2.

It is possible to get some beneficial results by increasing the tension of the cords towards the middle of the belt even when the belt retains a shape like that shown in Figure 4, because such a belt will always bend transversely when operating and if the tension in the cords are equal to begin with the cords near the sides will have a greater tension during operation than those near the middle of the belt thereby setting up forces that tend to destroy the belt. When the cords near the middle have a greater initial tension than those near the sides, the tension will equalize during operation. The problem presented by the construction of a belt of the shape shown in Figure 4 with cords having different tensions is very difficult compared to the method of construction above described and the latter has therefore been adopted as the most practical way of attaining the results desired. The transversely arcuate shape also offers greater resistance to transverse flexure than a transversely straight belt. By tensioning the cords in the manner described and arching the belt transversely, good results can be obtained even when the composition of the belt is the same for parts 6 and 8. By making the rubber composition layer 8 more rigid, a belt having greater resistance to transverse flexure is produced without any appreciable increase in the cost of material or the cost of manufacture.

It is apparent that with a belt constructed in the manner shown in Figure 2 and herein described, the tension in the cords will become equalized by a transverse deformation of the belt which tends to bring it into the shape shown in Figure 4 and this prevents the formation of separating forces that would otherwise become effective to separate the several parts of the belt during operation.

Although the construction described finds its greatest use in connection with wide belts of the type employed in speed changing devices, it is also beneficial if employed in connection with narrow belts, although in the latter case the tendency to deform the cross section of the belt during operation is small compared to that of wide belts.

In the above description the variation in tension of the cords has been stressed as the action of the belt can thereby be most readily explained. The action of the belt can, however, be described in another way, as follows: Textile cords of all kinds, including those used in belts will stretch to a considerable extent due to the elasticity of the fibers, the untwisting of the strands and perhaps to other causes. If the cords are not stretched beyond a certain limit, they will return to their original length or nearly so. When the stretch limit is reached, a further tension will extend the length of the cord very little, but the cord will resist a greatly increased force before it breaks. If we assume that the tension cords of the kind employed in belts will increase in length two and one-half per centum when subjected to a tension of forty pounds and that this is the average total extension within the elastic limit it is evident that if two cords are placed side by side in a belt, one being free from tension and the other stretched, one per centum of its length, the stretched cord will resist the greatest part of the belt tension because its limit of stretchability has been reduced by the initial stretching. We may now apply this to the present belt by stating that the stretchability of the cords decrease towards the middle of the belt. It is possible that after the belt has been cured, the fatigue of the fibers will produce a condition in which the tension equalizes, but stretchability of the cords will still remain different. The belt may therefore be defined as one in which the stretchability of the cords decreases from the side to the middle of the belt, instead of saying that the tension increases towards the middle.

The object aimed at is to produce a belt in which the tension required to transmit the power is borne to a greater extent by the cords near the middle of the belt than by those near the edges. If the outer cords are put under as great or greater tension than the more centrally positioned cords, the belt will begin to fail along the edges.

It is not sufficient to merely arch the belt transversely as this does not necessarily produce the variation in tension or stretchability that is required.

Attention is also called to the fact that the tension in the belt tends to flex it transversely only where it curves around the pulleys and not along the straight portions.

Having described the invention what is claimed as new is:

1. A belt of the V-type having a body formed principally from rubber composition, a layer of substantially inextensible longitudinally extending tensioned cords positioned in the body adjacent the neutral axis of the belt, the tension in the cords increasing from the sides inwardly towards the middle of the belt.

2. A belt of the V-type having a body formed principally from rubber composition, a layer of substantially inextensible longitudinally extending tensioned cords positioned in the body adjacent the neutral axis of the belt, the cord layer being transversely arched with its inner surface concave, the tension in the cords increasing from the sides inwardly towards the middle of the belt.

3. A belt of the V-type and of greater width than thickness, having a body formed principally from rubber composition, a layer of substantially inextensible longitudinally extending tensioned cords positioned in the body adjacent the neutral axis of the belt, the tension in the cords increasing from the sides inwardly towards the middle of the belt.

4. An endless belt of the V-type and of greater width than thickness, having a body formed principally from rubber composition, a layer of substantially inextensible parallel cords positioned substantially at the neutral axis of the belt, the cord layer being transversely arched with its inner surface concave, the cords in the finished belt being under varying tension, the tension in the cords increasing from the sides of the belt towards the middle thereof.

5. A belt of the V-type having a body formed from an outer layer of relatively rigid rubber composition and an inner layer of soft flexible rubber composition separated by a layer of longitudinally extending, substantially inextensible cords positioned adjacent the neutral axis of the belt, the cords in the finished belt being under tension, the tension of the cords increasing from the sides to the middle of the belt.

6. A belt of the V-type having a body formed from an outer layer of relatively rigid rubber composition and an inner layer of soft flexible rubber composition separated by a layer of longitudinally extending, substantially inextensible cords positioned adjacent the neutral axis of the belt, the belt being transversely arched with the inner surface of the cord layer concave, the cords in the finished belt being under tension, the tension of the cords increasing from the sides to the middle of the belt.

7. An endless belt of the V-type and of greater width than thickness whose body is formed from two layers of rubber composition of different rigidity separated by a layer of parallel, substantially inextensible cords, the cords in the finished belt being under tension, the tension of the cords increasing from the sides towards the middle of the belt, the outer layer being the more rigid and provided with transverse corrugations.

8. An endless belt of the V-type and of greater width than thickness comprising a body having two layers of rubber composition the inner being more elastic than the outer, a layer of parallel, substantially inextensible cords positioned between the two layers, the cords in the finished belt being under tension, the tension in the cords increasing from the sides to the middle of the belt, the cord layer being transversely and outwardly arched, the outer layer being transversely corrugated.

9. A longitudinally flexible belt of the V-type having inner and outer layers of rubber composition, a layer of parallel, substantially inextensible cords positioned between the layers, the outer layer being formed from comparatively rigid rubber having its outer surface formed with transversely extending ribs which serve to resist transverse flexure of the belt, the outer layer of rubber being flexible longitudinally of the belt, the inner layer being formed of resilient expansible rubber composition, the cords being under tension in the finished belt, the tension in the cords increasing from the sides to the middle of the belt, whereby when the belt flexes inwardly the tension in the cords will equalize.

10. A longitudinally flexible belt of the V-type having inner and outer layers of rubber composition, a layer of parallel, substantially inextensible cords positioned between the layers, the outer layer being formed from comparatively rigid rubber having its outer surface formed with transversely extending ribs which serve to resist transverse flexure of the belt, the outer layer of rubber being flexible longitudinally of the belt, the inner layer being formed of resilient expansible rubber composition, the cords being under tension in the finished belt, the tension in the cords increasing from the sides to the middle of the belt, the cord layer being transversely arched with the concave surface on the inside whereby when the belt flexes inwardly the tension in the cords will equalize.

11. A flexible endless belt of the V-type and of greater width than thickness having inner and outer surfaces with a layer of longitudinally extending cords located between the surfaces, a continuous body of comparatively rigid rubber between the cord layer and the outer surface whereby transverse flexing of the belt is resisted, said outer layer of rubber having lines of weakness formed therein transversely of the belt whereby the latter can flex longitudinally, and a continuous body of resilient rubber composition between the cord layer and the inner surface of the belt, the cord layer being transversely arched with its concave surface on the inside, the cords in the finished belt being under tension, the tension in the cords increasing from its sides inwardly towards the middle of the belt.

12. A flexible endless belt of the V-type and of greater width than thickness having inner and outer surfaces with a layer of longitudinally extending cords located between the surfaces, a continuous body of comparatively rigid rubber between the cord layer and the outer surface whereby transverse flexing of the belt is resisted, said rubber having its outer surface transversely corrugated, the depressions between the corrugations forming lines of weakness therein whereby the belt can flex longitudinally, and a continuous body of resilient rubber composition between the cord layer and the inner surface of the belt, the cord layer being transversely arched with its concave surface on the inside, the cords in the finished belt being under tension, the tension in the cords increasing from its sides inwardly towards the middle of the belt.

13. A flexible endless belt of the V-type and of greater width than thickness having inner and outer surfaces with a layer of longitudinally extending cords located between the surfaces, a continuous body of comparatively rigid rubber between the cord layer and the outer surface whereby transverse flexing of the belt is resisted, said outer layer of rubber having its outer surface transversely corrugated, the depressions between the corrugations forming lines of weakness therein whereby the belt can flex longitudinally, a continuous body of resilient rubber composition between the cord layer and the inner surface of the belt, the cord layer being transversely arched with its concave surface on the inside, the cords in the finished belt being under tension, the tension in the cords increasing from its sides inwardly towards the middle of the belt and a layer of bias cut cord fabric forming the outer surface of the transversely corrugated outer surface.

14. A flexible endless belt of the V-type and of greater width than thickness having inner and outer surfaces with a layer of longitudinally extending cords located between the surfaces, a continuous body of comparatively rigid rubber between the cord layer and the outer surface whereby transverse flexing of the belt is resisted, said outer layer of rubber having its outer surface transversely corrugated, the depressions between the corrugations forming lines of weakness therein whereby the belt can flex longitudinally, a continuous body of resilient rubber composition between the cord layer and the inner surface of the belt, the cords in the finished belt being under tension, the tension in the cords increasing from its sides inwardly towards the middle of the belt and a layer of bias cut cord fabric forming the outer surface of the transversely corrugated surface.

15. A belt of the V-type, having a body formed principally from rubberized composition, having a layer of cords extending longitudinally thereof and positioned adjacent the neutral axis of the belt, the cords being of different stretchability, the stretchability of the cords decreasing from the sides of the belt towards the middle.

16. A belt of the V-type and of greater width than thickness, having a body formed principally from rubberized composition, having a layer of cords extending longitudinally thereof and positioned adjacent the neutral axis of the belt, the cords being of different stretchability, the stretchability of the cords decreasing from the sides of the belt towards the middle.

17. A belt of the V-type and of greater width than thickness, having a body formed principally from rubberized composition, having a layer of cords extending longitudinally thereof and positioned adjacent the neutral axis of the belt, the cords being of different stretchability, the stretchability of the cords decreasing from the sides of the belt towards the middle, the cord layer being transversely arched with its concave surface on the inside.

ERNEST NASSIMBENE.